2,966,398

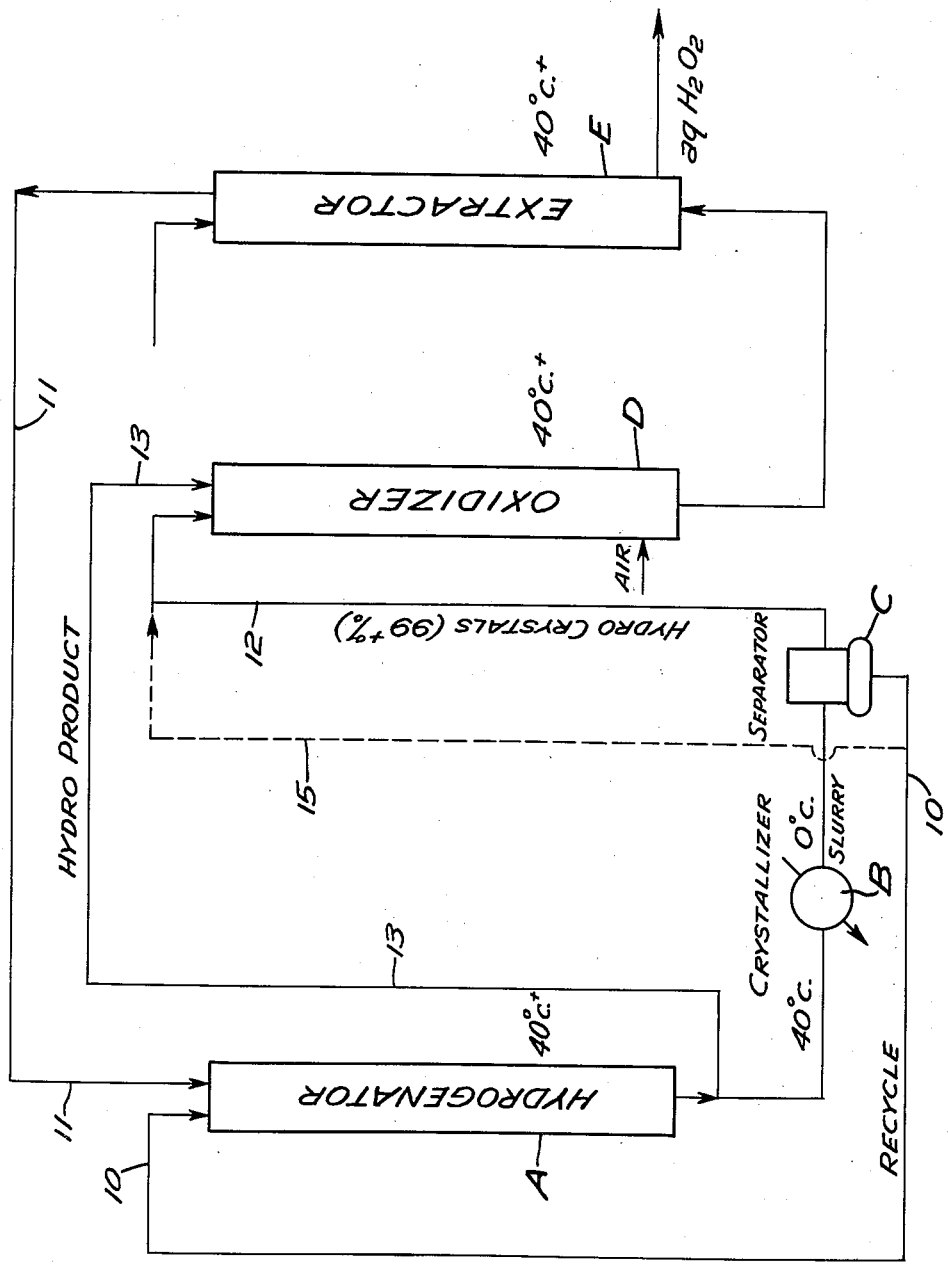

PRODUCTION OF HYDROGEN PEROXIDE BY SLURRYING THE ANTHRAQUINONE WORKING SOLUTION

Theodore M. Jenney, Kenmore, N.Y., assignor to Food Machinery and Chemical Corporation, San Jose, Calif.

Filed Mar. 12, 1958, Ser. No. 720,943

3 Claims. (Cl. 23—207)

This invention relates to the production of hydrogen peroxide and more particularly to a modification of the anthraquinone process for producing hydrogen peroxide.

In recent years there has been considerable commercial activity in the production of hydrogen peroxide by the cyclic reduction and oxidation of alkylated anthraquinones and their tetrahydro derivatives (the working material), generally by employing a mixed solvent containing a constituent for dissolving the hydroquinone form of the alkylated anthraquinone or tetrahydroanthraquinone used as the working material and a constituent for dissolving the quinone form of the working material. This particular concept and its commercial adaptation is described in U.S. Patents 2,158,525 and 2,215,883 and in PB Reports 395 and 4336.

In broad concept, the anthraquinone process employs three main operating stages: (1) a hydrogenator where the working material is reduced to the hydroquinone form; (2) an oxidizer where the hydroquinone form is oxidized to produce hydrogen peroxide with concomitant regeneration of the quinone form of the working material and (3) an extractor where hydrogen peroxide is generally extracted with water from the working solution.

In broad concept, at least, and on a theoretical basis, one mol of quinone form of working material when reduced produces one mol of the hydroquinone form thereof which, upon oxidation, produces one mol of hydrogen peroxide. Attempts to increase the productivity of a particular installation for operating the anthraquinone process have been made heretofore and comprise the provisions of solvents having a greater dissolving power for the working material thereby increasing the amount of hydrogen peroxide produced per pass through the equipment, all as exemplified by U.S. Patents 2,537,516, 2,537,655, 2,768,065 and 2,768,066.

Suggestions have also been made for employing specified alkylated anthraquinones such as tertiary butyl anthraquinone or mixtures thereof which would dissolve to a greater extent in the solvents normally employed and thereby increase production of hydrogen peroxide in a particular system. See Patent No. 2,689,169. There is also described in an application of Darbee and Kreuz, Serial No. 618,069, filed October 24, 1956, particular anthraquinone mixtures having increased solubility in the usual solvents employed in the anthraquinone process.

In all of these operations great care has been taken to prevent deposition or crystallization from the working solvent of any of the working material in the hydroquinone form. The working solvent contained a constituent which was employed by reason of its dissolving power for the hydroquinone form of the working material. This class of solvents generally possesses a relatively low dissolving power for the quinone form of the working material and possesses a poorer distribution coefficient for hydrogen peroxide than does the constituent in the mixed solvent which is employed as the solvent for the quinone form of the working material. Thus reduction or elimination of the solvent for the hydroquinone form would reduce volume of working solution per pass and would increase the overall extraction efficiency.

It is an object of the present invention to provide an improvement in the operation of the anthraquinone process whereby greater yields of hydrogen peroxide are formed per pass through the equipment.

It is also an object of the invention to substantially reduce the amount of solvent constituent in the mixed solvent employed for solution of the hydroquinone form of the working material and to thereby increase the amount of hydrogen peroxide that can be produced in one pass through the equipment.

It is a further object of the invention by so reducing the amount of solvent heretofore employed for dissolving the hydroquinone form of the working material to increase the concentration of hydrogen peroxide present in the working solution and, as an ancillary advantage, to increase concentration of hydrogen peroxide in the aqueous extract.

It is a still further object of the invention to produce, by the anthraquinone process, an aqueous extract of hydrogen peroxide which need not be concentrated by distillation as it is obtainable at a recognized commercial concentration.

In the single figure attached hereto there is illustrated a flowsheet of the invention in which a hydrogenator is illustrated at A in diagrammatic form, a cooler and crystallizer at B, a crystal separator at C which may be a filter, thickener or centrifuge, an oxidizer at D and an extractor at E.

In broad aspect, the invention comprises the preparation of a work solution which consists of a working solvent and a working material. The working solvent comprises any of those solvents known to be solvents for the quinone form of the working material, as for instance dimethylnaphthalene, diphenyl, anisole, benzene or toluene, the preferred solvent being an alkylated naphthalene and those solvents known to be solvents for the hydroquinone form of the working material, organic phosphate esters, organic phosphonate esters, $C_7$ to $C_{11}$ aliphatic alcohols and water immiscible ketones and ethers. Generally, however, the solvent constituent for the hydroquinone form of the working material is very materially reduced and even eliminated.

The working material may be any of the alkylated anthraquinones heretofore employed in the anthraquinone process, such as methyl-, ethyl-, propyl-, tertiarybutyl-, or mixtures of these materials with themselves or with their tetrahydro derivatives. In general, the working solution of the present invention will contain from 4 to 24% of working material in the hydrogenator A.

In accordance with the present invention, this working solution is passed to the hydrogenator and is there treated with gaseous hydrogen at conventional pressures generally employed for hydrogenation in the anthraquinone process, say one to 20 atmospheres, at a temperature of from room temperature to about 60° C. and generally at a temperature of from about 40° C. to 60° C. until the solubility limit of the hydroquinone so formed is reached.

Since the solubility of hydroquinone in the working solution employed in the present invention is somewhat lower than the solubility of hydroquinone in the conventional mixed solvents, a lower concentration of the hydroquinone form of the working material is maintained in the hydrogenator and hence the adverse effects of socalled overhydrogenation with loss of reusable working material is substantially reduced.

In the next stage of the improved anthraquinone process of the present invention, the hydrogenated working solution is withdrawn from the hydrogenator A and, in one modification of the procedure, a portion sent to a cooler and crystallizer B where the temperature of the working solution is reduced. The reduction in temperature is sufficient to crystallize and precipitate some hydroquinone form of working material from solution. The temperature reduction is generally from 10° C. to about 30° C. below that of the temperature in the hydrogenator. Such precipitated crystals are sent to separator C which may be a centrifuge, to separate working solution therefrom to produce a slurry of such crystals.

In another modification, all of the effluent from hydrogenator A is sent to the crystallizer B and separator C, the crystals carrying enough entrained solvent for solution of the quinone form of the working material produced in oxidizer D.

The separated mother liquor from separator C is returned to hydrogenator A through line 10 and becomes a part of the feed in the cyclic process to the hydrogenator, the remaining part of the feed coming from extractor E through line 11.

The heavy slurry of crystals of the hydroquinone form of the working material is fed to oxidizer D through line 12 where oxidation of the hydroquinone form of the working material to the quinone form occurs merely by contact with air or other convenient sources of oxygen with production of hydrogen peroxide and the quinone form of the working material, both of which end products are soluble in the working solvent. The portion of discharge from hydrogenator A not sent to the cooler and crystallizer, is sent directly to the oxidizer D through line 13 and the amount thereof is determined as that amount sufficient to dissolve the quinone form of the working material resulting from the oxidation of the hydroquinone form carried into the oxidizer D through lines 12 and 13. If additional solvent be required in oxidizer D, it may be obtained from the separator through line 15.

The speed of the oxidation is substantially the same as that which occurs in the homogeneous working solution heretofore treated in the oxidizer.

Whereas in typical operations as performed heretofore, a concentration of hydrogen peroxide of approximately one gram per liter was produced, it is possible to obtain concentrations of hydrogen peroxide in accordance with the procedures of the present invention so high as three grams per liter. When such a solution is now treated in the extractor E, a final aqueous extract of about 50% $H_2O_2$ by weight results in contrast with weight concentrations of 20% attainable heretofore.

The following examples are given as illustrative of the invention and are not to be deemed limitative thereof.

*Example 1*

In this example, a mixed solvent of approximately 4 parts by weight of dimethylnaphthalene and 3 parts by weight of trioctylphosphate containing 12% by weight of 2-ethylanthraquinone was hydrogenated at 40° C. to the usual 50% hydrogenation depth. When two-thirds of the hydrogenated working solution was cooled and crystallized there was sent to the oxidizer six pounds of the hydroquinone form for each 100 pounds of hydrogenated working solution and 4 pounds of hydro form from the crystallizer.

There was recycled from the separator C, 176 pounds of working solvent, 12 pounds of 2-ethylanthraquinone and 8 pounds of the hydro form thereof.

The oxidizer received 104 pounds of each 300 pounds of product from the hydrogenator, i.e., 88 pounds of solvent, 10 pounds of the hydro form of the working material and 6 pounds of unhydrogenated working material. The oxidizer discharged as product, 16 pounds of 2-ethylanthraquinone, 88 pounds of solvent, and 1.4 pounds of hydrogen peroxide, which product when extracted with 3.3 pounds of water gave 4.7 pounds of aqueous hydrogen peroxide of 30% strength. This concentration of hydrogen peroxide (1.3%) in the product sent to the extractor is in contrast with the usual 0.8% in operation where the hydro form is maintained in solution.

*Example 2*

In this example, using the same solvent but a mixed quinone comprising the 2-ethylanthraquinone and its tetrahydro derivative, and hydrogenation to 50% depth, 750 pounds of hydrogenation product are cooled in the crystallizer and 100 pounds sent direct to the oxidizer. From the separator, 15 pounds of hydro crystals are sent to the oxidizer and 660 pounds of solvent containing 45 pounds of unhydrogenated form of the working material and 30 pounds of the hydroquinone form of the working material.

The oxidizer received therefore, 88 pounds of solvent, 6 pounds of hydroquinone form of worlking material and 6 pounds of quinone form of working material (100 pounds of hydrogenator product) plus 15 pounds of hydro crystals from the separator.

The oxidizer discharged to the extractor, and thence to the hydrogenator, 88 pounds of solvent, the mixed working material (16 pounds of 2-ethylanthraquinone and 11 pounds of its tetrahydro derivative) and left 2.9 pounds of hydrogen peroxide in the aqueous extract of 3.3 pounds of water, thus producing a 47% aqueous hydrogen peroxide.

*Example 3*

In this example, a solvent is used having very high solvency for the quinone form of the working material, but a low solvency for the hydroquinone form thereof. While any of the so-called quinone solvents may be used, there is illustrated in this example the employment of the dimethylnaphthalene.

In this example, 100 pounds of hydrogenator product contain only 2 pounds of hydro form of the working material, 6 pounds of 2-ethylanthraquinone and 92 pounds of dimethylnaphthalene.

For each 100 pounds of hydrogenator product sent directly to the oxidizer, 2700 pounds of such product are cooled, and 27 pounds crystals produced therefrom to be added to the oxidizer, leaving 2673 pounds to be recycled to the hydrogenator. The make-up of this material was 27 pounds of the hydroquinone form of the working material, 162 pounds of 2-ethylanthraquinone and 2484 pounds of solvent.

The oxidizer discharged to the extractor for recycling to hydrogenator, 35 pounds of 2-ethylanthraquinone and 92 pounds of solvent, leaving in 1.7 pounds of extracting water, 4.1 pounds of hydrogen peroxide, thus producing a 70% aqueous hydrogen peroxide.

What is claimed is:

1. The cyclic process of manufacturing hydrogen peroxide which comprises hydrogenating a working solution comprising an alkylated anthraquinone as a working material dissolved in a solvent comprising a quinone solvent therein until the hydroquinone form of such working material is produced, cooling such hydrogenated working solution at least about 10° C. until crystals of the hydroquinone form of the working material precipitate therefrom, separating a portion of the working solution from the mixture of the working solution and crystals so produced until a slurry of such crystals is formed and sending such crystal slurry to an oxidizer and oxidizing such slurry of the hydroquinone form of the working material until hydrogen peroxide is produced and then separating hydrogen peroxide therefrom and returning the residue of such working solution and the portion of the working solution separated from said mixture of working solution and crystals to the hydrogenator to be again hydrogenated.

2. The cyclic process of manufacturing hydrogen peroxide which comprises hydrogenating a working solution comprising an alkylated anthraquinone as a working material dissolved in a solvent comprising a quinone solvent therein until the hydroquinone form of such working material is produced, cooling such hydrogenated working solution at least about 10° C. until crystals of the hydroquinone form of the working material precipitate therefrom, separating a portion of the working solution from the mixture of working solution and crystals so produced until a slurry of such crystals is formed and sending such crystal slurry to an oxidizer and ozidizing such slurry of the hydroquinone form of the working material until hydrogen peroxide is produced and then separating hydrogen peroxide therefrom and returning the residue of such working solution to the hydrogenator along with the portion of the working solution separated from the crystals to the hydrogenation step.

3. The cyclic process of manufacturing hydrogen peroxide which comprises hydrogenating a working solution comprising an alkylated anthraquinone as a working material dissolved in a solvent comprising a quinone solvent until the hydroquinone form of the working material is produced, separating the so hydrogenated working solution into two portions, cooling one portion of such hydrogenated working solution at least about 10° C. until crystals of the hydroquinone form of the working material precipitate therefrom, separating a portion of the working solution from the mixture of working solution and crystals so produced in order to form a slurry, sending such slurry to an oxidizer and mixing the slurry therein with said other portion of the hydrogenated working solution and oxidizing the mixture until hydrogen peroxide is formed and then separating the hydrogen peroxide therefrom and returning the residue of such working solution along with the portion of the working solution separated from said mixture of working solution and crystals to the hydrogenation step.

References Cited in the file of this patent
UNITED STATES PATENTS
2,158,525    Riedl et al. _____ May 16, 1939